United States Patent [19]
Yang et al.

[11] Patent Number: 6,123,757
[45] Date of Patent: Sep. 26, 2000

[54] FRAGRANT INK FOR INK-JET PRINTERS

[75] Inventors: Arnold Chang Mou Yang, Hsinchu Hsien; Yi-Jing Leu, Taipei Hsien; Ta-Wei Hsueh, Taipei Hsien; Jane Hsueh, Taipei Hsien; Chris Huang, Taipei Hsien; Li-Wen Rau, Taipei Hsien, all of Taiwan

[73] Assignee: Microjet Technology Co., Ltd., Taiwan

[*] Notice: This patent is subject to a terminal disclaimer.

[21] Appl. No.: 09/123,325

[22] Filed: Jul. 28, 1998

[51] Int. Cl.$^7$ .................................................. C09D 11/02
[52] U.S. Cl. .................................... 106/31.02; 106/31.28; 106/31.58
[58] Field of Search ........................... 106/31.28, 31.58, 106/31.02

[56] References Cited

U.S. PATENT DOCUMENTS

| | | | |
|---|---|---|---|
| 437,781 | 10/1890 | Higgins | 106/31.02 |
| 730,897 | 6/1903 | Fisher | 106/31.02 |
| 1,320,631 | 11/1919 | Luscher | 106/31.02 |
| 1,816,978 | 8/1931 | Knight | 106/31.02 |
| 3,888,689 | 6/1975 | Maekawa et al. | 106/31.02 |
| 4,940,584 | 7/1990 | Tararuj et al. | 106/31.02 |
| 5,039,243 | 8/1991 | O'Brien | 401/49 |

FOREIGN PATENT DOCUMENTS

| | | | |
|---|---|---|---|
| 58043 | 1/1975 | Australia | 106/31.02 |
| 12977 | 1/1984 | Japan | 106/31.02 |
| 145263 | 8/1984 | Japan | 106/31.02 |
| 215670 | 9/1987 | Japan | 106/31.02 |
| 103673 | 4/1992 | Japan | 106/31.02 |
| 103674 | 4/1992 | Japan | 106/31.02 |
| 602482 | 5/1948 | United Kingdom | 106/31.02 |

OTHER PUBLICATIONS

Derwent abstract of JP60/032867, Feb. 1985.

*Primary Examiner*—Helene Klemanski
*Attorney, Agent, or Firm*—Peter F. Corles

[57] ABSTRACT

A fragrant ink is provided. The fragrant ink comprises an alcohol component, an imaging component, a fragrant agent component, and a deionized water component. In certain embodiments, the fragrant ink further comprises an ethanol component. The imaging component includes at least one of a soluble dye or pigment materials. The fragrant agent preferably includes a phenolic compound. The fragrant ink causes the paper on which it is printed to emit a pleasant scent.

13 Claims, No Drawings

FRAGRANT INK FOR INK-JET PRINTERS

BACKGROUND OF THE INVENTION

1. Field of the Invention

This invention is related to a fragrant ink and in particular to one for ink-jet printers which effectively causes the paper printed out by the ink-jet printers to emit a pleasant scent.

2. Description of the Prior Art

It has been proposed to add alcohol or isopropanol into the ink for ink-jet printers for reducing its drying time, or ammonia water to promote the vaporization of water. However, such additives possess unpleasant odors which cause the paper printed out by a given ink-jet printer to emit an offensive odor. A U.S. Patent assigned to Hewlett-Packard suggests adding a small amount (about 0.05–6.0 wt %) of alcohol such as ethanol, n-propanol, isopropanol, tert-butanol, n-pentanol, and benzylalcohol to reduce the drying time of the ink. Some of the inks commonly seen on the market contain isopropanol which will produce irritating odor. Most of the other inks use ammonia water to reduce the drying time which also produces an unpleasant odor, thereby raising the user's discomfort.

Therefore, it is an object of the present invention to provide a fragrant ink which can obviate and mitigate the above-mentioned drawbacks.

SUMMARY OF THE INVENTION

This invention is related to a fragrant ink for ink-jet printers.

According to a preferred embodiment of the present invention, a fragrant ink composed of among its components an alcohol, a soluble dye, a phenolic compound, a pigment material, and deionized water. The fragrant ink may, in certain embodiments, also contain ethanol. Paper printed with the fragrant ink will emit a pleasant scent.

It is the primary object of the present invention to provide a fragrant ink which can cause the paper printed out by ink-jet printers to emit a fragrant scent so as to produce a pleasant scent during the printing operation.

It is another object of the present invention to, for instance, provide a fragrant ink which can cause the paper printed out by ink-jet printers to emit the scent of orange, lemon, coconut, or the like when printing something in connection with fruits.

It is still another object of the present invention to, for instance, provide a fragrant ink which can cause the paper printed out by ink-jet printers to emit the scent of fruits or flowers when printing something in connection therewith, hence enabling it to be used as a teaching aid for children.

It is still another object of the present invention to provide a fragrant ink which is low in cost.

It is a further object of the present invention to provide a fragrant ink which is fit for practical use.

The foregoing objects and summary provide only a brief introduction to the present invention. These and other objects of the present invention, as well as the invention itself, are made apparent to those skilled in the art by the following detailed description of the invention and the claims. Throughout the Specification, all percentages are expressed in approximate weight percentages, unless otherwise specified.

Many other advantages and features of the present invention will become manifest to those versed in the art upon making reference to the detailed description and the illustrative examples disclosed therein.

DETAILED DESCRIPTION OF THE PREFERRED EMBODIMENTS

For the purposes of promoting an understanding of the principles of the invention, reference will now be made to exemplary embodiments. Specific language will be used to describe the same. It will, nevertheless, be understood that no limitation of the scope of the invention is thereby intended, such alterations and further modifications to the disclosed ink, and such further applications to the principles of the invention as disclosed herein being contemplated as would normally occur to one skilled in the art to which the invention relates.

The fragrant ink according to the present invention generally composed of an imaging component such as a soluble dye (or pigment) for providing color or other imaging, an organic medium (an alcohol) well-mixed with the dye to form a mixture, a fragrant agent well-mixed with the mixture for providing a pleasant scent, deionized water, and, in certain embodiments, an ethanol for increasing the solubility of the fragrant agent.

The alcohol may be selected from ethyleneglycol, diethyleneglycol, polyethyleneglycol, isopropanol, propyleneglycol, polypropyleneglycol, butanediol, pentanediol, hexanediol, or derivatives thereof.

The fragrant agent may be selected from phenolic compounds having different scents. The amount of the fragrant agent added in the fragrant ink is very small so that there is no influence on printing quality.

The dye is soluble in water for providing color to the fragrant ink.

The ethanol, when present in the fragrant ink, is used for increasing the solubility of the phenolic compound or other fragrant agent.

The amount of the alcohol contained in the fragrant ink is preferably 5%, but may range between 1.0–20.0%.

The amount of the soluble dye contained in the fragrant ink preferably ranges between 1.0–10.0%, but may range between 1.0–20.0%.

The amount of the pigment material contained in the fragrant ink is preferably 0.1–10.0%.

The amount of the fragrant agent contained in the fragrant ink is preferably 0.05–20.0%.

The amount of ethanol contained in the fragrant ink preferably ranges between 0–20.0%.

The present invention will now be illustrated in detail by way of the following examples:

EXAMPLE 1

Fresh Green Leaf-scented

The fragrant ink according to the present invention composed of:

diethyleneglycol 5%
soluble dye 3%
cis-3-hexenol 0.2%
ethanol 2%
deionized water 89.8%

The amount of fragrant glycol contained in the fragrant ink must be within a certain range. More or less than the range will influence the scent of the fragrant ink.

EXAMPLE 2

Orchid-scented diethyleneglycol 5%
soluble dye 3% linalool (7-dimethyl-1,6 octadien-3-ol) 0.2%
ethanol 2%
deionized water 89.8%

EXAMPLE 3

Mild Rose-scented diethyleneglycol 5%
soluble dye 3%
geraniol (2-tans-3-7-dimethyl-2-6-octadien-1-ol) 0.2%
ethanol 2%
deionized water 89.8%

EXAMPLE 4

Fresh and Sweet Rose Scented diethyleneglycol 5%
soluble dye 3%
nerol (2-cis-3,7-dimethyl-2,6-octadien-1-ol) 0.2%
ethanol 2%
deionized water 89.9%

EXAMPLE 5

Rose-scented diethyleneglycol 5%
soluble dye 3%
citronellol (3,7-dimethyl-6-octen-1-ol) 0.2%
ethanol 2%
deionized water 89.8%

EXAMPLE 6

Rose-scented diethyleneglycol 5%
soluble dye 3%
octanol (2,6-dimethyloctan-8-ol) 0.1%
ethanol 3%
deionized water 88.9%

EXAMPLE 7

Hydrolinalool-scented diethyleneglycol 5%
soluble dye 3%
tetrahydrolinalool (3,7-dimethyloctan-3-ol) 0.2%
ethanol 2%
deionized water 89.8%

EXAMPLE 8

Spicy Geraniol-scented diethyleneglycol 5%
soluble dye 3%
lavandulol (2,6-dimethylhydroxymethyl heptadiene-2,6) 0.2%
ethanol 2%
deionized water 89.8%

EXAMPLE 9

Lemon-scented diethyleneglycol 5%
soluble dye 3%
myrcenol (2-methyl-6-methylene-7-octen-2-ol) 0.2%
ethanol 2%
deionized water 89.8%

EXAMPLE 10

Clove-scented diethyleneglycol 5%
soluble dye 3%
α-terpineol (1-methyl-4-iso-propyl-1-cyclohexen-8-ol) 0.2%
ethanol 2%
deionized water 89.8%

EXAMPLE 11

Cool-menthol-scented diethyleneglycol 5%
soluble dye 3%
1-menthol (1,3-p-menthanol) 0.1%
ethanol 2%
deionized water 89.9%

EXAMPLE 12

Menthol-scented diethyleneglycol 5%
soluble dye 3%
isopulegol (p-menth-8-en-3-ol) 0.2%
ethanol 2%
deionized water 89.8%

EXAMPLE 13

Menthol-scented diethyleneglycol 5%
soluble dye 3%
nopol (6,6-dimethylbicyclo-(3,1,1)-2-heptene-2-ethanol) 0.1%
ethanol 2%
deionized water 89.8%

EXAMPLE 14

Flower-scented diethyleneglycol 5%
soluble dye 3%
farnesol (2,6,10-trimethyl-2,6,10-dodecatrien-12-ol) 0.05%
ethanol 3% deionized water 88.95%

EXAMPLE 15

Lilly-scented diethyleneglycol 5%
soluble dye 3%
nerolidol (3,7,11-trimethyl-1,6,10-dodecatrien-3-ol) 0.1%
ethanol 2%
deionized water 89.9%

EXAMPLE 16

Rose-scented diethyleneglycol 5%
soluble dye 3%
β-phenylethyl alcohol (benzyl carbinol, rose-P) 0.5%
deionized water 91.5%

EXAMPLE 17

Hyacinth-scented diethyleneglycol 5%
soluble dye 3%
τ-phenylpropyl alcohol (hydrocinnamic alcohol) 0.2%
deionized water 91.8%

EXAMPLE 18

Rose Hyacinth-scented diethyleneglycol 5%
soluble dye 3%
cinnamic alcohol (3-phenyl-2-propen-1-ol) 0.1%
ethanol 2%
deionized water 89.9%

EXAMPLE 19

Vanilla-scented diethyleneglycol 5%
soluble dye 3%
anisic alcohol (p-methoxy Benzyl alcohol) 0.1%
ethanol 2%
deionized water 89.9%

EXAMPLE 20

White Jasmine-scented diethyleneglycol 5%
soluble dye 3%
methyl phenyl carbinol (α-phenyl ethyl alcohol) 0.1%
ethanol 2%
deionized water 89.9%

EXAMPLE 21

Rose-scented diethyleneglycol 5%
soluble dye 3%
dimethyl phenyl carbinol (phenyl isopropyl alcohol) 0.1%
ethanol 2%
deionized water 89.9%

EXAMPLE 22

Rose-scented diethyleneglycol 5%
soluble dye 3%
phenoxyethyl alcohol (ethylene glycol monophenyl ether) 0.2%
deionized water 91.8%

EXAMPLE 23

Mild Flower-scented diethyleneglycol 5%
soluble dye 3%
phenyl glycol (monophenyl ethyleneglycol, styroly alcohol) 0.1%
deionized water 91.9%

EXAMPLE 24

Lilly-scented diethyleneglycol 5%
soluble dye 3%
β-phenylethyl dimethyl carbinol (dimethyl phenylethyl carbinol) 0.1%
deionized water 89.8%

The fragrant ink is applicable to various kinds of ink-jet print heads and can cause the paper printed out by the ink-jet printer to emit a pleasant scent and thereby produce a pleasant scent during the printing operation without influencing the printing quality nor increasing manufacturing cost. In addition, only a small amount of fragrant agent is sufficient to obtain the desired effect.

It will be understood that each of the elements described above, or two or more together may also find a useful application in other types of methods differing from the type described above.

While certain novel features of this invention have been shown and described and are pointed out in the appended claims, it is not intended to be limited to the details disclosed above. It will be understood that various omissions, modifications, substitutions, and changes in the forms and details of the ink illustrated may be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:
1. A fragrant ink composed of in weight percentages:
 (a) an alcohol component;
 (b) an imaging component;
 (c) a fragrant agent component;
 (d) a deionized water component; and,

(e) an ethnol component, said ethanol component being present within a weight percentage range approximating 2.0–20%;

said components being mixed one with the others, whereby said fragrant ink emits a fragrance.

2. The fragrant ink as recited in claim 1 wherein said imaging component includes a soluble dye.

3. The fragrant ink as recited in claim 2 wherein said soluble dye is present within a weight percentage range approximating 0.1–10%.

4. The fragrant ink as recited in claim 1 wherein said imaging component includes a pigment material, said pigment material being present within a weight percentage range approximating 0.1–10%.

5. The fragrant ink as recited in claim 1 wherein said alcohol component is selected from the group consisting of: ethyleneglycol, diethyleneglycol, polyethyleneglycol, isopropanol, propyleneglycol, polypropyleneglycol, butanediol, pentanediol, hexanediol, and derivatives thereof.

6. The fragrant ink as recited in claim 1 wherein said alcohol component is present within a weight percentage range approximating 1.0–20%.

7. The fragrant ink as recited in claim 1 wherein said deionized water component is present within a weight percentage range approximating 88.9–91.9%.

8. The fragrant ink as recited in claim 1 wherein said fragrant agent component is present within a weight percentage range approximating 0.05–20%.

9. The fragrant ink as recited in claim 8 wherein said fragrant agent component includes a phenolic compound.

10. The fragrant ink as recited in claim 1 wherein said fragrant agent includes farnesol.

11. The fragrant ink as recited in claim 1 wherein said fragrant agent includes β-phenylethyl alcohol.

12. A fragrant ink composed of in weight percentages:

(a) an alcohol component;

(b) an imaging component;

(c) a fragrant agent component; and, (d) a deionized water component;

said fragrant agent component being present within a weight percentage range 0.05–20%, said fragrant agent component including a material selected from the group consisting of: cis-3-hexenol, linalool, geraniol; nerol, citronellol, tetrahydrolinalool, lavandulol, α-terpineol, isopulegol, τ-phenylpropyl alcohol, and phenoxyethyl alcohol;

said components being mixed one with the others, whereby said fragrant ink emits a fragrance.

13. A fragrant ink composed of in weight percentages:

(a) an alcohol component;

(b) an imaging component;

(c) a fragrant agent component; and, (d) a deionized water component;

said fragrant agent component being present within a weight percentage range approximating 0.05–20%, said fragrant agent component including a material selected from the group consisting of: dimethyloctanol, myrcenol, 1-menthol, nopol, nerolidol, cinnamic alcohol, anisic alcohol, methyl phenyl, carbinol, dimethyl phenyl carbinol, phenyl glycol, β-phenylethyl alcohol, and β-phenylethyl dimethyl carbinol;

said components being mixed one with the others, whereby said fragrant ink emits a fragrance.

\* \* \* \* \*